(12) United States Patent
Ma

(10) Patent No.: US 8,959,385 B2
(45) Date of Patent: Feb. 17, 2015

(54) SYNCHRONIZED FAILOVER FOR ACTIVE-PASSIVE APPLICATIONS

(71) Applicant: Microsoft Corporation, Redmond, WA (US)

(72) Inventor: Tianchi Ma, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 14/268,379

(22) Filed: May 2, 2014

(65) Prior Publication Data

US 2014/0245060 A1    Aug. 28, 2014

Related U.S. Application Data

(63) Continuation of application No. 13/299,165, filed on Nov. 17, 2011, now Pat. No. 8,756,455.

(51) Int. Cl.
| | | |
|---|---|---|
| G06F 11/00 | (2006.01) | |
| G06F 11/20 | (2006.01) | |
| G06F 11/14 | (2006.01) | |
| G06F 11/34 | (2006.01) | |
| G06F 11/07 | (2006.01) | |

(52) U.S. Cl.
CPC .......... *G06F 11/2007* (2013.01); *G06F 11/006* (2013.01); *G06F 11/1482* (2013.01); *G06F 11/1484* (2013.01); *G06F 11/3423* (2013.01); *G06F 11/0709* (2013.01); *G06F 11/0757* (2013.01); *G06F 11/2025* (2013.01); *G06F 11/2028* (2013.01); *G06F 2201/865* (2013.01)
USPC .......................................... 714/4.11; 714/11

(58) Field of Classification Search
None
See application file for complete search history.

(56) References Cited

U.S. PATENT DOCUMENTS

| | | | |
|---|---|---|---|
| 5,978,933 | A | 11/1999 | Wyld et al. |
| 6,023,772 | A | 2/2000 | Fleming |
| 6,477,663 | B1 | 11/2002 | Laranjeira et al. |
| 6,651,185 | B1 | 11/2003 | Suavage |
| 7,287,186 | B2 | 10/2007 | McCroy |
| 7,710,865 | B2 | 5/2010 | Naseh |
| 7,743,155 | B2 | 6/2010 | Pisharody |
| 7,783,914 | B1 | 8/2010 | Havemose |
| 7,802,128 | B2 | 9/2010 | Dasari et al. |
| 8,839,034 | B2 * | 9/2014 | Havemose et al. ............. 714/15 |

(Continued)

OTHER PUBLICATIONS

Nexenta Systems, Inc., "NexentaStor HA Cluster User Guide", May 5, 2010, 37 pages.

(Continued)

*Primary Examiner* — Yolanda L Wilson
(74) *Attorney, Agent, or Firm* — Ben Tabor; David Andrews; Micky Minhas

(57) ABSTRACT

The present invention extends to methods, systems, and computer program products for synchronized active-passive application failover. A data connection to a single data source can be used as a synchronizations point. Interoperating instance side and data source side algorithms coordinate to transition a passive instance to an active instance within a specified period of time when a prior active instance fails. An active-passive controller can operate as an active-active module within an active-active environment to provide active-passive failover to active-passive modules. Application virtual names can be mapped to application instance electronic addresses to assist external modules in establishing application connections to active-passive applications.

20 Claims, 6 Drawing Sheets

(56) References Cited

U.S. PATENT DOCUMENTS

| | | |
|---|---|---|
| 2010/0106842 A1 | 4/2010 | Cosmadopolous et al. |
| 2011/0061061 A1 | 3/2011 | Chen et al. |
| 2012/0131639 A1 | 5/2012 | Alex et al. |
| 2013/0132946 A1 | 5/2013 | Ma |
| 2014/0149792 A1* | 5/2014 | Scales et al. ............ 714/15 |

OTHER PUBLICATIONS

Whitepaper, "Real World Oracle Real Application Cluster Challenges", Nov. 22, 2006, Linxcel Europe Ltd, 24 pages.

White Paper, "Vmware High Availability", May 5, 2008, 29 pages.

Starwind Software, "Starwind's Active—Active High Availability Storage Architecture", Apr. 21, 2011, 5 pages.

Office Action dated Nov. 15, 2013 cited in U.S. Appl. No. 13/299,165.

Notice of Allowance dated Feb. 3, 2014 cited in U.S. Appl. No. 13/299,165.

* cited by examiner

400

401 — Loading One Or More Active-Active Modules For One Or More Active-Active Applications On An Instance Of A Virtual Machine Running In The Distributed System

402 — Loading An Active-Passive Failover Controller On The Instance Of The Virtual Machine, The Active-Passive Failover Controller Loaded As A Stateless Module Having Active-Active Failover Within The Distributed System, The Active-Passive Failover Controller Exposing A Synchronization Point To Refresh Status For Instances Of Active-Passive Applications Such That When An Active Instance Fails An Available Passive Instance Can Take Over As A New Active Instance

403 — Hosting A Plurality Of Instances Of An Active-Passive Application In The Active-Passive Failover Controller, The Plurality Of Instances Including A Currently Active Instance And One Or More Passive Instances

404 — Each Of The Plurality Of Instances Calling The Active-Passive Controller To Refresh Status

405 — The Currently Active Instance Failing

406 — A Passive Instance Becoming A New Active Instance Based On Refreshed Statuses For The Plurality Of Instances, The Passive Instance Selected From Among The One Or More Passive Instances

*Figure 4*

SYNCHRONIZED FAILOVER FOR ACTIVE-PASSIVE APPLICATIONS

CROSS-REFERENCE TO RELATED APPLICATIONS

This application is a continuation of U.S. patent application Ser. No. 13/299,165, filed on Nov. 17, 2011, entitled "SYNCHRONIZED FAILOVER FOR ACTIVE-PASSIVE APPLICATIONS," which issued as U.S. Pat. No. 8,756,455 on Jun. 17, 2014, and which application is expressly incorporated herein by reference in its entirety.

BACKGROUND OF THE INVENTION

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, an entity builds out an infrastructure and runs applications, such as, for example, Web services, "on-premise" within the infrastructure. In other environments, one entity uses another entity's infrastructure to run application on behalf of the entity. For example, one entity can run an application on machines in another entities data center. Running an application in another entities data center can be referred to as running an application "in the cloud".

When applications are run in the cloud, computing resources and storage resources of the data center are allocated to a user. Data centers providing cloud based resources can require an account so that the owner of the cloud resource can bill for resource usage. As such, one desiring to use cloud based resources can establish an account for that purpose.

Once an account is established, setting up an application within the cloud typically includes configuring two components, computing resources and data storage resources. Users are charged for use of any computing resources until the computing resources are de-allocated. As such, a user essentially rents resources from the owner of the cloud.

Some applications (or modules within an application) that run in the cloud are configured as active-passive applications. Active-passive applications are designed in a way that only one (active) instance can be running at a time. Other (passive) instances can stand by ready to become active when appropriate. However, failing over to a passive instance can be difficult. For example, there needs to be a synchronization pointer to be sure that one instance is picked to become active when a currently active instance fails.

Other applications (or modules within an application) that run in the cloud are configured as active-active applications. Active-active applications are designed in a way that any number of (active) instances can run simultaneously. Proper implementation of active-passive failover in these types of environments can suffer from further difficulties. For example, an active-passive failover framework may have to be deployed separately from other active-active applications.

Further, in either type of environment, it may be difficult to locate a currently active instance within a cloud when a failover occurs.

BRIEF SUMMARY

The present invention extends to methods, systems, and computer program products for synchronized failover for active-passive applications. In some embodiments, the status for instances of an application are refreshed. A data service runs at a computer system. The data service stores data to control synchronization among a plurality of instance of an active-passive application. The stored data includes an active instance value and a last touch value. The active instance value identifies the currently active application instance for the active-passive application. The last touch value indicates a time when the currently active application instance last refreshed status. The data service exposes a status function to application instances for refreshing status.

The data service receives a call at the status function. The call originates from an instance of the active-passive application and includes an identifier value identifying calling application instance. The status function refreshes the status of the calling application instance in response to the call. The status function determines if the identifier value corresponds to the active instance value.

When the identifier value corresponds to the active instance value, the last touch value is changed to the current time. A status of active is returned to the calling application instance. When the identifier value does not correspond to the active instance value, the status function determines if an idle timeout has been exceeded based on the last touch value. When the idle time has been exceeded, the identifier value is stored as the active instance value to make the calling application instance the currently active application instance. The last touch value is changes to the current time. A status of active is returned to the calling application instance. When the idle time has not been exceeded, a status of passive is returned to the calling application instance.

In other embodiments, a failover controller that facilitates active-passive failover is hosted for an application. One or more active-active (stateless) modules for one or more active-active applications are loaded on an instance of a virtual machine running in a distributed system. An active-passive failover controller is loaded on the instance of the virtual machine. The active-passive failover controller is loaded as a stateless module having active-active failover within the distributed system. The active-passive failover controller exposes a synchronization point to refresh status for instances of active-passive applications. Accordingly, when an active instance fails, an available passive instance can take over as a new active instance.

A plurality of instances of an active-passive application are hosted in the active-passive failover controller, the plurality of instances include a currently active instance and one or more passive instances. Each of the plurality of instances calls the active-passive controller to refresh status. The currently active instance is indicated as failed. A passive instance becomes a new active instance based on refreshed statuses for the plurality of instances. The passive instance is selected from among the one or more passive instances.

In further embodiments, the location of the active instance within a distributed system is indicated. A passive instance, from among one or more passive instances, becomes a currently active instance. The currently active instance registers a network address for a virtual name to a host file refreshing framework. The host file refreshing framework is configured to periodically flush out mappings from network addresses to virtual name registrations to modules within the distributed network that utilize a host file client for the host file refreshing framework.

The host file refreshing framework flushes the registration of the network address for the virtual name to one or more modules that utilize the host file client such that any of the one or more modules can use the registration to connect to the active-passive application. A module, from among the one or more modules, connects to the passive-active application by using the virtual name to connect to the currently active instance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a flow chart of an example method for hosting a failover controller that facilitates active-passive failover for an application.

DETAILED DESCRIPTION

Figure 1:
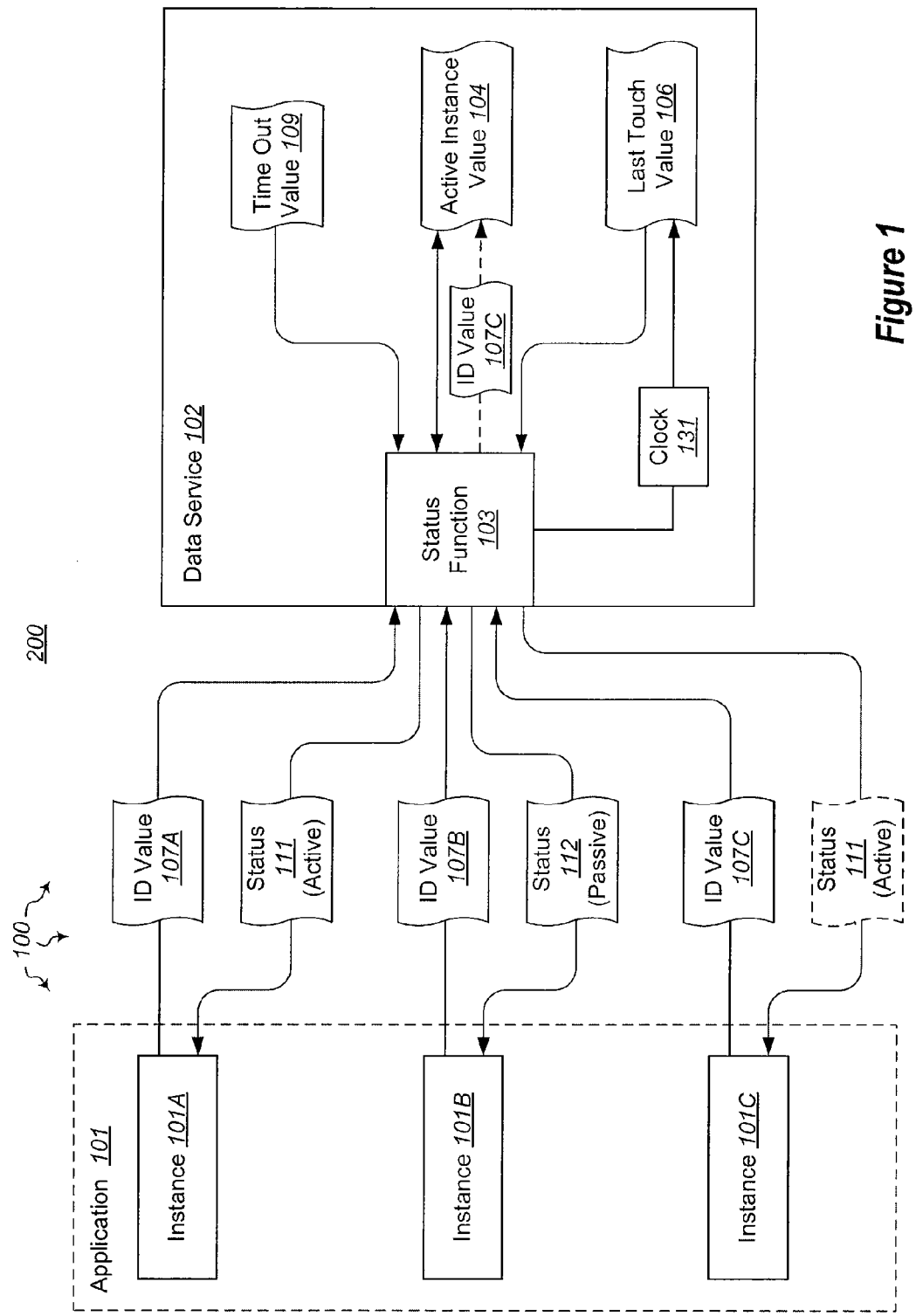
FIG. 1 illustrates an example computer architecture that facilitates refreshing the status for instances of an application.

The present invention extends to methods, systems, and computer program products for synchronized active-passive application failover. In some embodiments, the status for instances of an application are refreshed. A data service runs at a computer system. The data service stores data to control synchronization among a plurality of instance of an active-passive application. The stored data includes an active instance value and a last touch value. The active instance value identifies the currently active application instance for the active-passive application. The last touch value indicates a time when the currently active application instance last refreshed status. The data service exposes a status function to application instances for refreshing status.

The data service receives a call at the status function. The call originates from an instance of the active-passive application and includes an identifier value identifying calling application instance. The status function refreshes the status of the calling application instance in response to the call. The status function determines if the identifier value corresponds to the active instance value.

When the identifier value corresponds to the active instance value, the last touch value is changed to the current time. A status of active is returned to the calling application instance. When the identifier value does not correspond to the active instance value, the status function determines if an idle timeout has been exceeded based on the last touch value. When the idle time has been exceeded, the identifier value is stored as the active instance value to make the calling application instance the currently active application instance. The last touch value is changes to the current time. A status of active is returned to the calling application instance. When the idle time has not been exceeded, a status of passive is returned to the calling application instance.

In other embodiments, a failover controller that facilitates active-passive failover is hosted for an application. One or more active-active (stateless) modules for one or more active-active applications are loaded on an instance of a virtual machine running in a distributed system. An active-passive failover controller is loaded on the instance of the virtual machine. The active-passive failover controller is loaded as a stateless module having active-active failover within the distributed system. The active-passive failover controller exposes a synchronization point to refresh status for instances of active-passive applications. Accordingly, when an active instance fails, an available passive instance can take over as a new active instance.

A plurality of instances of an active-passive application are hosted in the active-passive failover controller, the plurality of instances include a currently active instance and one or more passive instances. Each of the plurality of instances calls the active-passive controller to refresh status. The currently active instance is indicated as failed. A passive instance becomes a new active instance based on refreshed statuses for the plurality of instances. The passive instance is selected from among the one or more passive instances.

In further embodiments, the location of the active instance within a distributed system is indicated. A passive instance, from among one or more passive instances, becomes a currently active instance. The currently active instance registers a network address for a virtual name to a host file refreshing framework. The host file refreshing framework is configured to periodically flush out mappings from network addresses to virtual name registrations to modules within the distributed network that utilize a host file client for the host file refreshing framework.

The host file refreshing framework flushes the registration of the network address for the virtual name to one or more modules that utilize the host file client such that any of the one or more modules can use the registration to connect to the active-passive application. A module, from among the one or more modules, connects to the passive-active application by using the virtual name to connect to the currently active instance.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entities data center or "in the cloud."

FIG. 1 illustrates an example computer architecture 100 that facilitates refreshing the status for instances of an application. Referring to FIG. 1, computer architecture 100 includes application 101 (e.g., a scheduler) and data service 102. Application 101 has a number of instances, including instances 101A, 101B, and 101C. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, application 101 is an active-passive application. That is, there is one active instance of application 101 and one or more passive instances of application 101 at any given time. The passive instances are essentially on stand-by to take over as a new active instance if a current active instance fails or otherwise stops operating as intended.

Data service 102 serves as a single data source used for synchronization among instances of application 101. Data service 102 exposes status function 103 to instances of application 101. Instances of application 101 can call status function 103 to refresh their status (as either active or passive). Upon receiving a call from an application instance, status function 103 can refer to one or more of: active instance value 104, last touch value 106, and time out value 109 to determine the status of the calling application instance as either an active instance or a passive instance.

In some embodiments, status function 103 determines that an application instance is to maintain a current status either as an active instance or a passive instance. In other embodiments, status function 103 determines that an application instance is to transition from being a passive instance to being an active instance. In further embodiments, status function 103 determines that an application instance is to transition from being an active instance to being a passive instance. Status function 103 can return a determined status back to a calling application instance.

Status function 103 can also update active value instance 104 and last touch value 106 as appropriate. For example, when a previously passive instance is to transition to an active instance, status function 103 can store the ID value for the new active instance in active instance value 104. Further, when an instance is determined to be an active instance (either by maintaining a current active instance or transitioning to a new active instance), clock 131 can store the time of the determination in last touch value 106.

An application instance can include logic to maintain an active or passive status, to transition from active status to passive status, and to transmission from passive status to active status. The logic can utilize a status returned from status function 103 when to determining to maintain a status or transition between statuses. The logic can also include other mechanisms for locally transitioning active status to passive status (e.g., based on an idle timeout).

Figure 2:
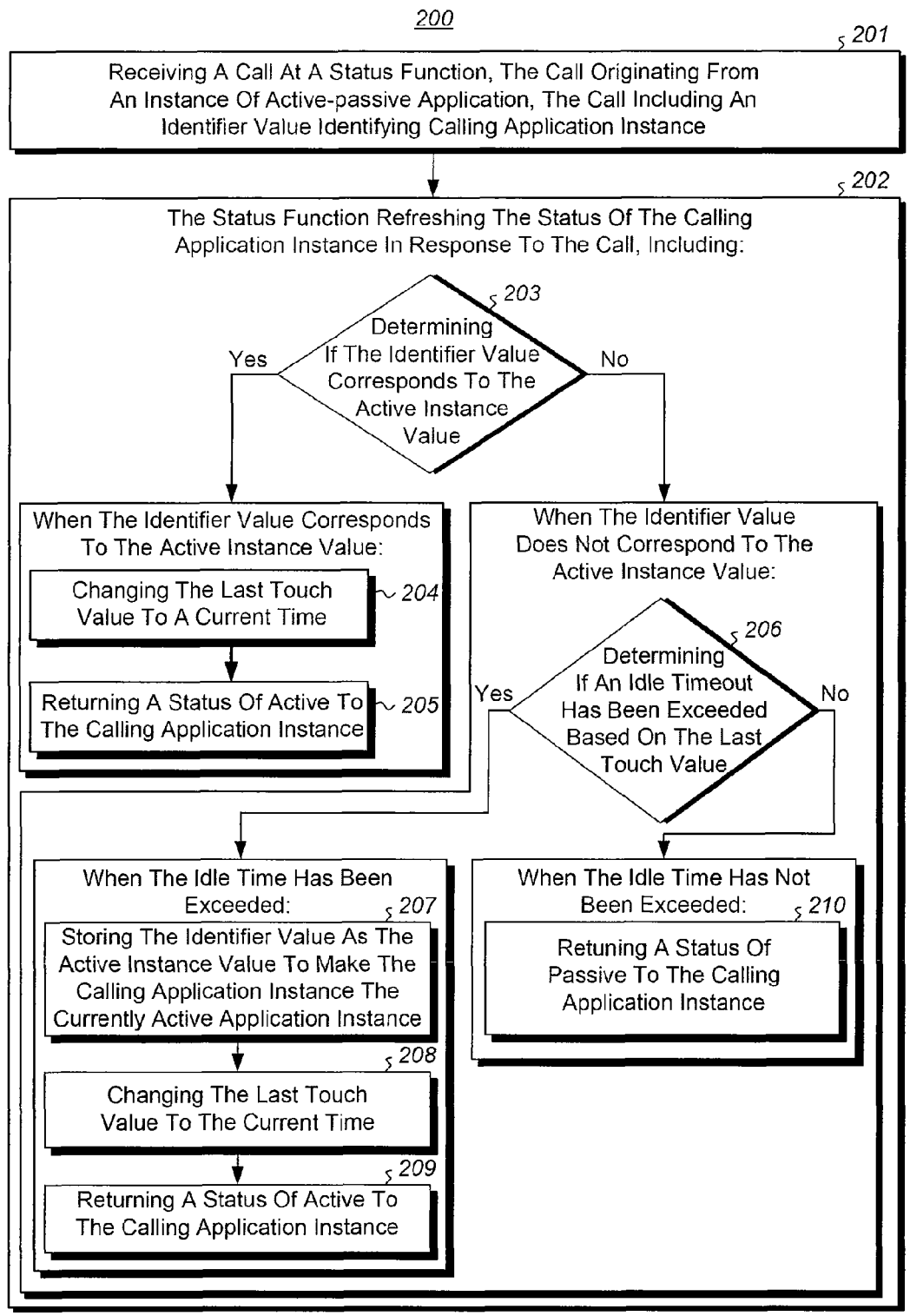
FIG. 2 illustrates a flow chart of an example method for refreshing the status for instances of an application.

FIG. 2 illustrates a flow chart of an example method 200 for refreshing the status for instances of an application. Method 200 will be described with respect to the components and data of computer architecture 100.

Method 200 includes an act of receiving a call at a status function, the call originating from an instance of the active-passive application, the call including an identifier value identifying calling application instance (act 201). For example, status function 103 can receive ID value 107A from instance 101A. Application 101 can be an active-passive application. Method 200 includes an act of the status function refreshing the status of the calling application instance in response to the call (act 202). For example, status function 103 can refresh the status of instance 101A.

Method 200 includes an act of determining if the identifier value corresponds to the active instance value (act 203). For example, status function 103 can determine if ID value 107A corresponds to (or even matches) active instance value 104. When status function 103 determines that ID value 107A does corresponds to active instance value 104, data service 102 views instance 101A as the currently active instance of application 101.

When the identifier value corresponds to the active instance value (YES at act 203), method 200 includes an act of changing the last touch value to a current time (act 204). For example, when ID value 107A does correspond to active instance value 104, clock 131 can change last touch value 106 to a current time at data service 102. Changing last touch value 106 to a current time stores the time when instance 101A (e.g., the active instance) last contacted status function 103. When the identifier value corresponds to the active instance value (YES at act 203), method 200 also includes an act of returning a status of active to the calling application instance (act 205). For example, when ID value 107A does correspond to active instance value 104, status function 103 can return status 111 (active) to instance 101A. Logic at instance 101A can use status 111 to determine that data service 102 still views instance 101A as an active instance of application 101.

When the identifier value does not correspond to the active instance value (NO at 203), method 200 includes an act of determining if an idle timeout has been exceeded based on the last touch value (act 206). For example, status function 103 can receive ID value 107C from instance 101C. In response, status function 103 can refresh the status of instance 101C. Status function 103 can determine if ID value 107C corresponds to active instance value 104. When status function 103 determines that ID value 107C does not correspond to active instance value 104, data service 102 views instance 101C as a passive instance of application 101. Subsequently, status function 103 determines if time out value 109 has been exceeded based on last touch value 106. That is, when ID value 107C is received, status function 103 determines if it has it been longer than time out value 109 since instance 101A last called status function 103. When time out value 109 is exceeded, instance 101C can be selected as the new active instance.

When the idle time has been exceeded (YES at 206), method 200 includes an act of storing the identifier value as the active instance value to make the calling application instance the currently active application instance (act 207). For example, when time out value 109 has been exceeded, status function 103 can store ID value 107C as active instance value 104. When the idle time has been exceeded (YES at 206), method 200 also includes changing the last touch value to the current time (act 208). For example, when time out value 109 has been exceeded, clock 131 can change last touch value 106 to a current time at data service 102. Changing last touch value 106 to a current time stores the time when instance 101C (e.g., the new active instance) last contacted status function 103.

When the idle time has been exceeded (YES at 206), method 200 also includes returning a status of active to the calling application instance (act 209). For example, when time out value 109 has been exceeded, status function 103 can return status 111 (active) to instance 101C. Logic at instance 101C can use status 111 to determine that data service 102 now views instance 101C as an active instance of application 101. Through local logic and/or subsequent calls to status function 103, instance 101A can transition to a passive instance.

Alternately, status function 103 can receive ID value 107B from instance 101B. In response, status function 103 can refresh the status of instance 101B. Status function 103 can determine if ID value 107B corresponds to active instance value 104. When status function 103 determines that ID value 107B does not correspond to active instance value 104, data service 102 views instance 101B as a passive instance of application 101. Subsequently, status function 103 determines if time out value 109 has been exceeded based on last touch value 106. That is, when ID value 107B is received, status function 103 determines if it has it been longer than time out value 109 since instance 101A last called status function 103. When time out value 109 is not exceeded, instance 101B can be indicated as a passive instance (i.e., instance 101A last checked in within a specified period of time).

When the idle time has not been exceeded (NO at 206), method 200 includes an act retuning a status of passive to the calling application instance. For example, when time out value 109 is not exceeded, status function 103 can return status 112 (passive) to instance 101B. Logic at instance 101B can use status 112 to determine that data service 102 views instance 101C as a passive instance of application 101.

Any number of different algorithms at instances 101A, 101B, and 101C and at status function 103 can be used to synchronize selection of an active instance. In some embodiments, the following example algorithms can be used at instances 101A, 101B, and 101C:

```
ActiveModeTimer: // If the instance is on active state
    if Now − LastUpdate > IdleTimeout then
        // This is to automatically give up if the
        // previous database operations are taking a long time
        SwitchToPassive
    else
        if GetStatus(Id) == Passive then
            SwitchToPassive
        else
            LastUpdate = Now
PassiveModeTimer: // If the instance is on passive state
```

```
    if GetStatus(Id) == Active then
        SwitchToActive
```

Each instance 101A, 101B, and 101C, runs a regular timer to call the appropriate function. Which timer runs can depend on the current status of an instance. When an instance is an active instance, the instance calls ActiveModeTimer. When an instance is a passive instance, the instance calls PassiveModeTimer.

Referring now to ActiveModeTimer, when an instance is an active instance it can maintain a LastUpdate and an IdleTimeout (e.g., between 10 and 30 seconds). The timer mode interval can be between 5 and 10 seconds. The timer mode interval can be the same or differ between the ActiveModeTimer and the PassiveModeTimer.

Based on LastUpdate and an IdleTimeout the instance can determine if it has been waiting too long to perform current operations. When an instance has been waiting too long, the instance can switch to a passive instance. When an instance has not been waiting too long, it can call GetStatus. GetStatus can be exposed at a data service, such as, for example, as status function 103. When GetStatus returns a status of "Passive", the instance can switch to a passive instance. When the GetStatus returns a status of "Active", the instance changes LastUpdate to the current time at the instance.

Referring now to PassiveModeTimer, an instance can call GetStatus. When GetStatus returns a status of "Active", the instance can switch to an active instance.

In some embodiments, status function 103 can implement the following corresponding GetStatus algorithm:

```
GetStatus(Id) :
    if ActiveId = -1 then
        // First time an instance calling in, make it active
            ActiveId = Id
            LastTouch = Now
            return Active
        else
            return Passive
    else
        if ActiveId == Id then // An active instance keeps active
            LastTouch = Now
            return Active
        else
            if Now - LastTouch > IdleTimeout then
                // A passive instance becomes active because the current
                active instance timeout
                    ActiveId = Id
                    LastTouch = Now
                    return Active
            else
                return Passive
```

As depicted, GetStatus receives an ID from an application instance. GetStatus can be an atomoc serive exposed at data service 102. At data service 102, a tuple <ActiveId, LastTouch> can be defined to control the synchronization among all instances. The definition of the items can be as follows:

ActiveId: The ID of the current active instance. −1 (or some other initialization value) when initialized.

LastTouch: The time this control set got touched by the active instance.

Each instance (e.g., 101A, 101B, and 101C) can regularly call GetStatus (e.g., either from an ActiveModeTimer or a PassiveMode Timer) and refresh its current status (active or passive). The IdleTimeout value in the GetStatus algorithm can be essentially the same as or somewhat longer than the IdleTimeout value used in the ActiveModeTimer algorithm to allow an instance sufficient time to contact the GetStatus algorithm.

When ActiveId is the initialization value, the first instance to call GetStatus is selected as an active instance. When a calling instance is currently active instance, the algorithm updates LastTouch with a current time and returns active to the call instance. Thus, the algorithm indicates to an active instance that it is to remain an active instance.

When the calling instance is a passive instance, the algorithm first determines if the active instance last called within a specified period of time. When the active instance has not called within the specified period of time, the algorithm (a) sets ActiveId to ID value of the call instance, (b) updates LastTouch with a current time, and (c) returns active to the call instance. Thus, the algorithm indicates to a passive instance that it is to transition to an active instance. Further, when the prior active instance next calls the algorithm, the algorithm can return passive since ActiveID has changed.

When the active instance has called within the specified period of time, the algorithm returns passive to the calling instance. Thus, the algorithm indicates to a passive instance that it is to remain a passive instance.

Figure 3:
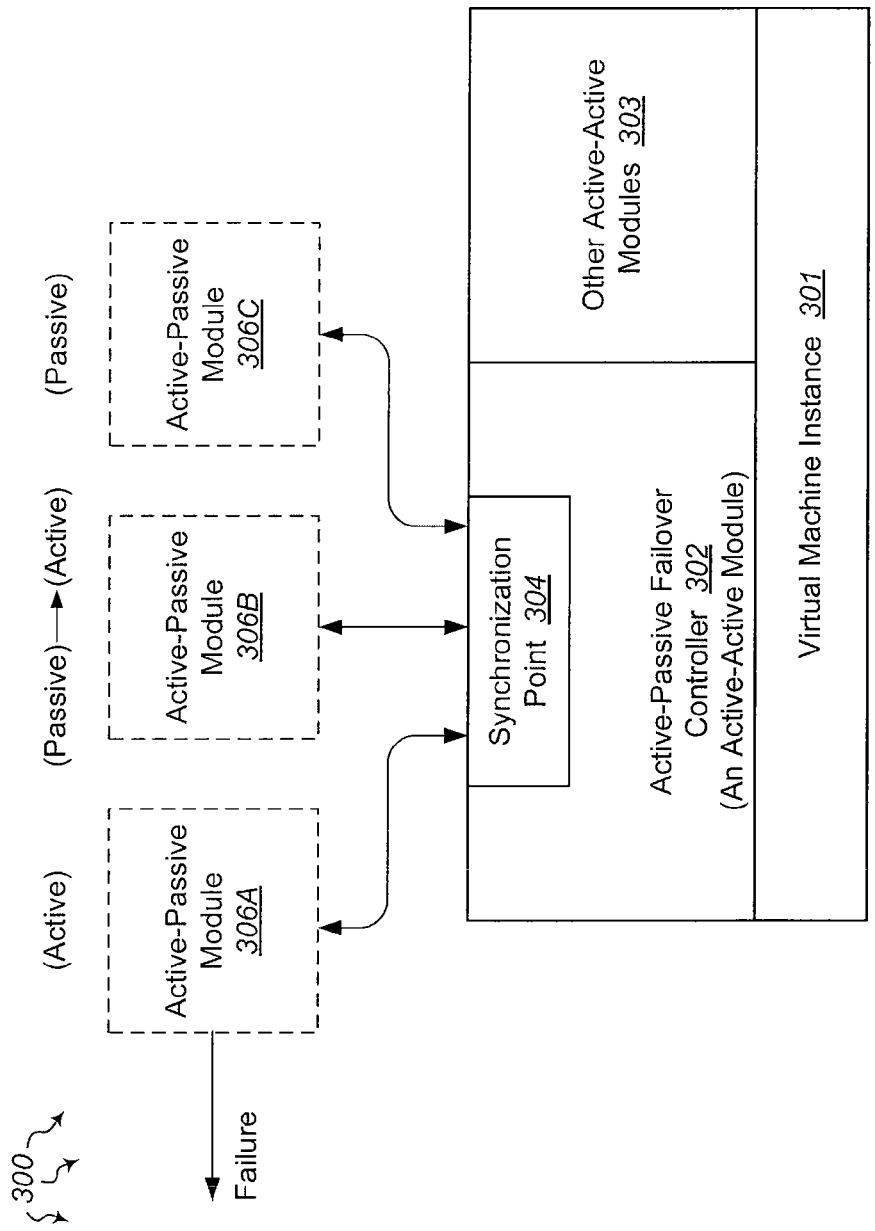
FIG. 3 illustrates an example computer architecture that facilitates hosting a failover controller that facilitates active-passive failover for an application.

Failover related logic can be into controller module. The controller module can be stateless and have active-active failover. As such, the controller can be hosted together with other active-active modules. Any modules hosted in the controller module can failover in an active-passive way. FIG. 3 illustrates an example computer architecture 300 that facilitates hosting a failover controller that facilitates active-passive failover for an application.

As depicted in computer architecture 300, active-passive failover controller 302 and other active-active modules 303 are loaded on virtual machine instance 301. Virtual machine instance 301 can be a cloud instance virtual machine. Active-passive failover controller 302 can be an active-active module that provides active-passive failover capabilities to active-passive modules 306A, 306B, and 306C through synchronization point 304. Active-passive modules 306A, 306B, and 306C can implement algorithms as previously described with respect to instances 101A, 101B, and 101C. Active-passive failover controller 302 can implement algorithms previously described with respect to status function 103.

FIG. 4 illustrates a flow chart of an example method 400 for hosting a failover controller that facilitates active-passive failover for an application. Method 400 will be described with respect to the components and data of computer architecture 300.

Method 400 includes an act of loading one or more active-active modules for one or more active-active applications on an instance of a virtual machine running in the distributed system (act 401). For example, other active-active modules 303 can be loaded on virtual machine instance 301.

Method 400 an act of loading an active-passive failover controller on the instance of the virtual machine, the active-passive failover controller loaded as a stateless module having active-active failover within the distributed system, the active-passive failover controller exposing a synchronization point to refresh status for instances of active-passive applications such that when an active instance fails an available passive instance can take over as a new active instance (act 402). For example, active-passive failover controller 302 can be loaded on virtual machine instance 301. Active-passive failover controller 302 can expose synchronization point 304 to active-passive modules. Accordingly, active-passive modules can call synchronization point 304 to refresh status. Through calls to synchronization point 304, a passive instance can take over for an active instance when an active instance fails or otherwise operates in an unintended manner.

Method 400 includes an act of hosting a plurality of instances of an active-passive application in the active-passive failover controller, the plurality of instances including a currently active instance and one or more passive instances (act 403). For example, active-passive modules 306A, 306B, and 306C can be hosted in active-passive failover controller 302. Active-passive module 306A can be active and active-passive modules 306B and 306C can be passive.

Method 400 includes an act of each of the plurality of instances calling the active-passive controller to refresh status (act 404). For example, each of active-passive modules 306A, 306B, and 306C can call synchronization point 304 to refresh status. Method 400 includes an act of the currently active instance failing (act 405). For example, active-passive module 306A can fail. Method 400 includes an act of a passive instance becoming a new active instance based on refreshed statuses for the plurality of instances, the passive instance selected from among the one or more passive instances (act 406). For example, active-passive module 306A can transition from a passive instance to an active instance based on a status returned from synchronization point 304.

A virtual name can be assigned to a module. When an instance of the module becomes active, it can register an electronic address (e.g., its Internet Protocol ("IP") address) with the virtual name to a host file refreshing framework. From time to time, the mapping can be flushed to other modules that have a hostfile client installed. When other modules connect to the module, the other modules can use the virtual name and transparently locate to the currently active instance of the module.

Figure 5:
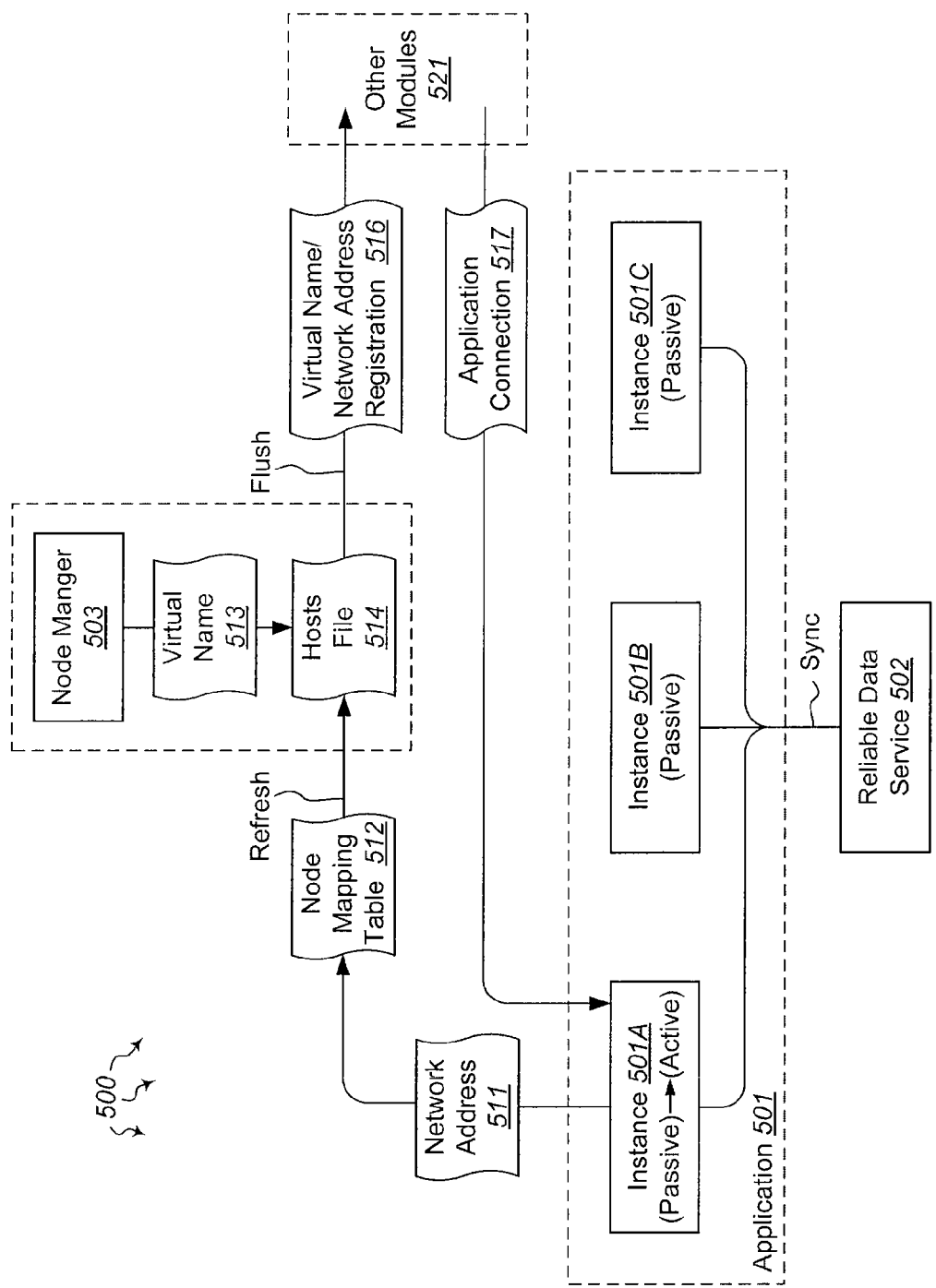
FIG. 5 illustrates an example computer architecture that facilitates indicating the location of the active instance within a distributed system.

FIG. 5 illustrates an example computer architecture 500 that facilitates indicating the location of the active instance within a distributed system. As depicted, computer architecture 500 includes reliable data service 502, application 501, node manager 503, and other modules 521 (e.g., cloud based modules). Instances of application 501, including instances 501A, 501B, and 501C, can call reliable data service 502 to synchronize instance status (e.g., as active or passive) among one another. Node manager 503 can formulate virtual name 513 representing application 501. An active instance of application 501 can submit an electronic address to node mapping table 512 that is eventually flushed to hosts file 514. Hosts file 514 maps the electronic address to virtual name 513. The hosts file can be flushed to other modules that then use the electronic address to connect to the active instance of application 501.

Figure 6:
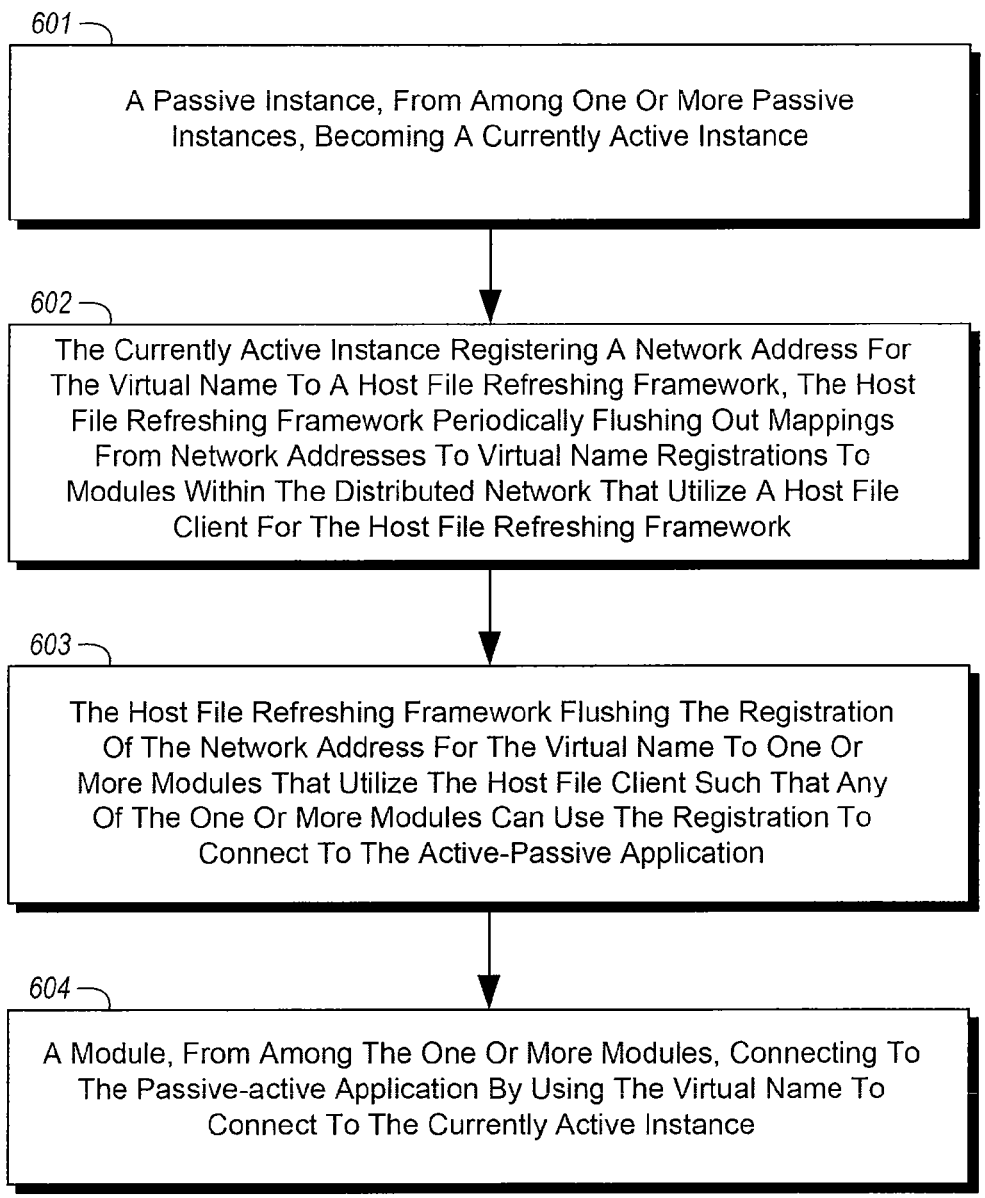
FIG. 6 illustrates a flow chart of an example method for indicating the location of the active instance within a distributed system.

FIG. 6 illustrates a flow chart of an example method 600 for indicating the location of the active instance within a distributed system. Method 600 will be described with respect to the components and data of computer architecture 500.

Method 600 includes an act of a passive instance, from among the one or more passive instances, becoming a currently active instance (act 601). For example, instance 501A can transition from a passive instance to an active instance. Instances 501A can transition from a passive instance as a result of a prior active instance failing, timing out, or operating in some other unintended manner.

Method 600 includes an act of the currently active instance registering a network address for the virtual name to a host file refreshing framework, the host file refreshing framework periodically flushing out mappings from network addresses to virtual name registrations to modules within the distributed network that utilize a host file client for the host file refreshing framework (act 602). For example, instance 501A can register network address 511 with node mapping table 512. Node mapping table 513 can then be used to refresh hosts file 514. Node manager 503 can refresh hosts file 514 to map network address 511 to virtual name 513. Other modules that utilize a host client file can then access the mapping.

Method 500 includes an act of the host file refreshing framework flushing the registration of the network address for the virtual name to one or more modules that utilize the host file client such that any of the one or more modules can use the registration to connect to the active-passive application (act 603). For example, node manager 503 can flush virtual name/network address mapping 516 (mapping network address 511 to virtual name 513) to other modules 521. As such other modules 521 can use network address 511 to access application 501.

Method 500 includes an act of a module, from among the one or more modules, connecting to the passive-active application by using the virtual name to connect to the currently active instance (act 604). For example, a module in other modules 521 can use virtual name 513 to send application connection 517 to instance 501. Application connection 517 is used by the module to connect to application 501.

In some embodiments, application 501 is a scheduler module that uses active-passive failover.

In some embodiments, the availability of a certain module instance can be defined as a combination ("AND" relationship) of the following criteria:
1. The instance itself is running
2. The module running on that instance is not detected to be in a failed mode
3. The data connection mentioned above is available In these embodiments, if an instance is in active mode and any of the above isn't fulfilled, the module can be viewed as failed. Otherwise, the module is viewed as running. As such, failover algorithms can help ensure that if one instance goes to a failed mode and there are available passive instances, one of the available passive instances becomes active and running within a given period of time.

Accordingly, in general, a (potentially reliable) data connection to a single data source (e.g., a distributed database) can be used as a synchronization point. Interoperating instance side and data source side algorithms coordinate to transition a passive instance to an active instance within a specified period of time when a prior active instance fails. An active-passive controller can operate as an active-active module within an active-active environment. The active-passive controller can provide active-passive failover to active-passive modules. Application virtual names can be mapped to application instance electronic addresses to assist external modules in establishing application connections to active-passive applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processor; and
   one or more hardware storage devices having stored computer-executable instructions which, when executed by the one or more processors, implement a method for hosting a failover controller that facilitates active-passive failover for an application, the computing system interoperating with one or more computer systems in a distributed system, the distributed system natively supporting active-active failover, wherein the method includes:

an act of loading one or more active-active modules for one or more active-active applications on an instance of a virtual machine running in the distributed system;

an act of loading an active-passive failover controller on the instance of the virtual machine, the active-passive failover controller loaded as a stateless module having active-active failover within the distributed system, the active-passive failover controller exposing a synchronization point to refresh status for instances of active-passive applications such that when an active instance fails an available passive instance can take over as a new active instance;

an act of hosting a plurality of instances of an active-passive application in the active-passive failover controller, the plurality of instances including a currently active instance and one or more passive instances;

an act of each of the plurality of instances calling the active-passive controller to refresh status;

an act of the currently active instance failing; and an act of a passive instance becoming a new active instance based on refreshed statuses for the plurality of instances, the passive instance selected from among the one or more passive instances.

2. The computing system as recited in claim 1, wherein an act of the currently active instance failing comprises an act of detecting the currently active instance has timed out.

3. The computing system as recited in claim 1, wherein loading the active-passive failover controller on the instance of the virtual machine comprises an act of loading the active-passive failover controller on a cloud instance virtual machine.

4. The computing system as recited in claim 1, wherein the act of hosting a plurality of instances of an active-passive application comprises an act of hosting a plurality of instances of a cloud based scheduler.

5. The computing system as recited in claim 1, wherein the passive instance is selected to become the new active instance from among the one or more passive instances based on status information returned from the synchronization point.

6. The computing system as recited in claim 1, wherein the new active instance registers an electronic address with a virtual name that is used by other modules to locate the new active instance.

7. The computing system as recited in claim 1, wherein the method also includes an act of detecting that the currently active instance has failed in response to detecting that a stored last touch value associated with a status of the currently active instance is greater than a predetermined idle time out value.

8. The computing system as recited in claim 1, wherein the one or more active-active applications includes a scheduler application.

9. One or more hardware storage devices having stored computer-executable instructions which, when executed by one or more processors of a computing system, implement a method for hosting a failover controller that facilitates active-passive failover for an application, the computing system interoperating with one or more computer systems in a distributed system, the distributed system natively supporting active-active failover, wherein the method includes:

an act of loading one or more active-active modules for one or more active-active applications on an instance of a virtual machine running in the distributed system;

an act of loading an active-passive failover controller on the instance of the virtual machine, the active-passive failover controller loaded as a stateless module having active-active failover within the distributed system, the active-passive failover controller exposing a synchronization point to refresh status for instances of active-passive applications such that when an active instance fails an available passive instance can take over as a new active instance;

an act of hosting a plurality of instances of an active-passive application in the active-passive failover controller, the plurality of instances including a currently active instance and one or more passive instances;

an act of each of the plurality of instances calling the active-passive controller to refresh status;

an act of the currently active instance failing; and an act of a passive instance becoming a new active instance based on refreshed statuses for the plurality of instances, the passive instance selected from among the one or more passive instances.

10. The one or more hardware storage devices as recited in claim 9, wherein an act of the currently active instance failing comprises an act of detecting the currently active instance has timed out.

11. The one or more hardware storage devices as recited in claim 9, wherein loading the active-passive failover controller on the instance of the virtual machine comprises an act of loading the active-passive failover controller on a cloud instance virtual machine.

12. The one or more hardware storage devices as recited in claim 9, wherein the act of hosting a plurality of instances of an active-passive application comprises an act of hosting a plurality of instances of a cloud based scheduler.

13. The one or more hardware storage devices as recited in claim 9, wherein the passive instance is selected to become the new active instance from among the one or more passive instances based on status information returned from the synchronization point.

14. The one or more hardware storage devices as recited in claim 9, wherein the new active instance registers an electronic address with a virtual name that is used by other modules to locate the new active instance to a host file refreshing framework, wherein the host file refreshing framework flushes out mappings from network addresses to virtual name registrations to modules within the distributed network that utilize a host file client for the host file refreshing framework such that any of the one or more modules can use the registration to connect to the active-passive application, and which results in at least one module from among the one or more modules, connecting to the passive-active application by using the virtual name to connect to the currently active instance.

15. The one or more hardware storage devices as recited in claim 9, wherein the method also includes an act of detecting that the currently active instance has failed in response to detecting that a stored last touch value associated with a status of the currently active instance is greater than a predetermined idle time out value.

16. One or more hardware storage devices having stored computer-executable instructions which, when executed by one or more processors of a computing system, implement a method for indicating the location of an active instance within a distributed system, the computing system interoperating with one or more computer systems in the distributed system, a plurality of instances of an active-passive module running in the distributed system, the plurality of instances including an active instance and one or more passive instances, wherein a virtual name is assigned to the active-passive module within the distributed system and wherein the method includes:

an act of a passive instance, from among the one or more passive instances, becoming a currently active instance due to the active instance failing;

an act of the currently active instance registering a network address for the virtual name to a host file refreshing framework, and wherein the host file refreshing framework flushes out mappings from network addresses to virtual name registrations to modules within the distributed network that utilize a host file client for the host file refreshing framework such that any of the one or more modules can use the registration to connect to the active-passive application, and which results in at least one module from among the one or more modules, connecting to the active-passive application by using the virtual name to connect to the currently active instance.

17. The one or more hardware storage devices as recited in claim 16, wherein the flushing of the registration of the network address for the virtual name to one or more modules includes flushing the registration of the network address to one or more cloud-based modules.

18. The one or more hardware storage devices as recited in claim 16, wherein at least one cloud-based module connects to the currently active instance.

19. The one or more hardware storage devices as recited in claim 16, wherein the passive-active application is a scheduler.

20. The one or more hardware storage devices of claim 16, wherein the computer program product comprises the computing system with the one or more processors.

* * * * *